R. LOVETT.
Feed Rack.
No. 54,745.                                                Patented May 15, 1866.
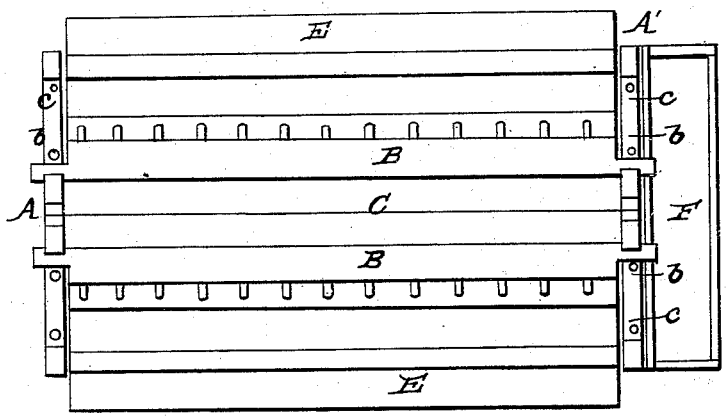
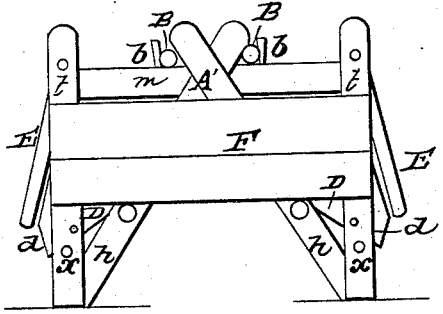
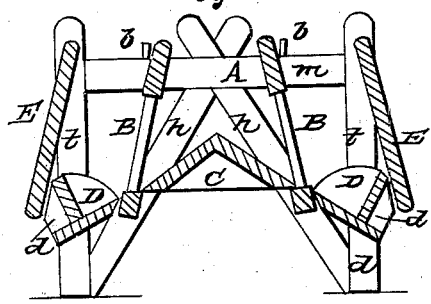

UNITED STATES PATENT OFFICE.

RODMAN LOVETT, OF CANTON, OHIO.

IMPROVEMENT IN COW AND SHEEP RACKS.

Specification forming part of Letters Patent No. 54,745, dated May 15, 1866.

*To all whom it may concern:*

Be it known that I, RODMAN LOVETT, of Canton, in the county of Stark and State of Ohio, have invented certain new and useful Improvements in Cow and Sheep Racks; and I do hereby declare that the following is a full, clear, and exact description of the same, reference being had to the accompanying drawings and the letters of reference marked thereon.

Figure 1 represents a plan view of the rack. Fig. 2 represents an end view of the same. Fig. 3 represents a cross-section.

In the drawings hereto annexed, and forming a part of this specification, A A' represent two end sections of the cow and sheep rack. These sections are each composed of four pieces of timber or scantling connected together and forming one section.

$t\,t$ are the two uprights, which are connected by a bar, $m$. From the center of said bar, and extending slightly above the same, are two braces, which extend in an oblique direction to the bottom of the uprights $t\,t$ and form the legs of the rack.

B B represent two ordinary-shaped ladder hay-racks, which are provided with tenons, and are placed between and connect the sections A and A'. A suitable opening for the tenons to pass through is made in the oblique braces $h\,h$ near the point where they are fastened to the uprights $t\,t$. A pin passes through the lower tenons of the hay-racks B B, thereby connecting the hay-racks and sections. The hay-racks B B are not connected to the sections at the top, the upper tenons of said racks merely resting upon the top of connecting-bars $m$ of the sections, and held in the position desired on said bar by a pin, $b$, set in an opening to prevent the hay-racks from moving back and forth. The bars $m$ of the sections A and and A' are provided with small holes $c$ on the upper side, to adjust the racks B by means of the pins heretofore described.

D $d$ represent two double revolving troughs, which are pivoted at their ends to the bars $t$ of sections A A' near the bottom of said uprights and in front of the hay-racks B B. These troughs are made by attaching one board or piece of lumber to another at right angles and at about half-way, then closing the ends, as is shown in Fig. 3. These troughs are kept from turning upon their axis by a pin, $x$, so when the pin is withdrawn the troughs can be turned, having either a large or small trough, one of which can be used for water, while the other can be used for grain or other feed, thus having a clean trough to feed from.

Between the hay-racks B B, and resting upon the bottom pieces of the same, is the guide-board C. This board is convex on its upper side and concave on its under side, having pieces at each end for connecting the same, thereby forming a large trough or manger. The object of this guide-board is to prevent the waste of fodder and carry the dust and dirt that arise from the hay and the seed to the troughs D $d$ at each side. At the same time it acts as a flooring for the hay. By drawing the pins $b$ on bars $m$ and sliding the hay-racks forward this board can be taken out and reversed for a trough or manger for cattle, &c.

E E represent the flaps, which are pivoted near the top of the uprights $t$, and hang on the outside of the rack and cover the troughs D $d$ and hay-racks B B. These flaps readily turn upon their pivots as an axis, and can be thrown up and over the top, which form a covering for the entire rack when it is desired to feed the cows, sheep, &c. When these lids are down, as shown in accompanying drawings, the cows, sheep, &c., cannot get at the feed.

F is an adjustable trough of the ordinary form, which is connected at the ends of the section A' by means of pins in the troughs and openings in the section A' to place the pins. This trough can be taken off when desired, and one can be placed at each of the sections A and A'. These troughs are for the purpose of giving salt or any other food or drink to the sheep, cows, &c., or can be used for feeding hogs.

It will be seen that this cow and sheep rack can be easily taken apart and stored away when not required or when required to transport it.

When the hay is placed upon the guide-board C the hay-racks B B are thrown forward and the hay placed between said racks, when they are crowded back and secured by the pins, which position prevents the hay and dust from falling upon the necks or bodies of the sheep or cattle. When the lids are down the grain is poured into the troughs D or d from the top.

Having thus fully described my invention, what I claim as new, and desire to secure by Letters Patent, is—

1. The sections A A', hay-racks B B, revolving troughs D d, and guide-board C, arranged substantially as and for the purposes set forth.

2. The adjustable hay-racks B B, when arranged and used for the purposes set forth.

3. The adjustable trough F, in combination with the sections A A', when used as and for the purposes specified.

As evidence that I claim the foregoing I have hereunto set my hand in the presence of two witnesses.

RODMAN LOVETT.

Witnesses:
W. W. CLARK,
A. PIERCE.